(12) United States Patent
Volkmann et al.

(10) Patent No.: US 6,464,251 B1
(45) Date of Patent: *Oct. 15, 2002

(54) SIDE CURTAIN AIRBAG MODULE

(75) Inventors: Matthias Volkmann, Kronberg (DE); Guido Klettenheimer, Kelsterbach (DE); Marcus Wahl, Wiesbaden (DE); Daniel Zink, Oberems (DE); Volker Hofmann, Frankfurt (DE); Falk Hölscher, Mainz-Kastel (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/970,204

(22) Filed: Oct. 3, 2001

(30) Foreign Application Priority Data

May 4, 2001 (DE) ...................................... 201 07 578 U

(51) Int. Cl.[7] .............................................. B60R 21/22
(52) U.S. Cl. ..................................... 280/730.2; 280/749
(58) Field of Search ........................... 280/730.2, 743.1, 280/749

(56) References Cited

U.S. PATENT DOCUMENTS

| | | | |
|---|---|---|---|
| 5,884,937 A | * 3/1999 | Yamada | 280/743.1 |
| 5,921,576 A | * 7/1999 | Sinnhuber | 280/730.2 |
| 6,073,961 A | 6/2000 | Bailey et al. | 280/730.2 |
| 6,099,029 A | 8/2000 | Haland et al. | 280/729 |
| 6,142,509 A | * 11/2000 | White, Jr. et al. | 280/728.2 |
| 6,209,907 B1 | 4/2001 | Fischer | 280/728.3 |
| 6,227,561 B1 | * 5/2001 | Jost et al. | 280/743.1 |
| 6,237,941 B1 | * 5/2001 | Bailey et al. | 280/729 |
| 6,375,214 B1 | * 4/2002 | Nishikaji | 280/728.2 |

* cited by examiner

Primary Examiner—Eric Culbreth
(74) Attorney, Agent, or Firm—Jarett Rieger; Lonnie Drayer

(57) ABSTRACT

A side curtain airbag module is installed in a vehicle roof liner extending in a direction going between the front and rear of the vehicle. The side curtain airbag module has a gas supply device comprising a hose that is connected to a gas generator. The gas supply device extends in a longitudinal direction with respect to the module. A side curtain airbag is located laterally with respect to the gas supply device. The side curtain airbag is folded in a zigzag manner forming layers that extend essentially parallel to a direction in which the side curtain airbag is deployed when the side curtain airbag is inflated with gas. During deployment of the side curtain airbag the entire folded side curtain airbag packet is prevented from being ejected out of the side curtain airbag module at the beginning of the deployment process. An inflated side curtain airbag is provided as soon as the side curtain airbag is deployed into the passenger compartment of the vehicle.

4 Claims, 2 Drawing Sheets

SIDE CURTAIN AIRBAG MODULE

FIELD OF THE INVENTION

The present invention relates to a side curtain airbag module for installation in the roof liner of a motor vehicle.

BACKGROUND OF THE INVENTION

Side curtain airbag modules are generally installed in a motor vehicle along a roof beam from the A-pillar to the C-pillar of the vehicle. A side curtain airbag is deployed parallel to a side of the vehicle, that is to say between a vehicle occupant and a side window of the vehicle.

Side curtain airbag modules generally comprise a gas supply device having a tube or hose that extends into the airbag and is connected to a source of inflation gas, such as a gas generator. The side curtain airbag is folded such that it is located beneath the gas supply device in the direction of deployment of the airbag. The entire folded side curtain airbag is thus positioned in the direction of deployment in front of the gas supply device. With this arrangement, the activation of the source of inflation gas and the deployment of the airbag cause the entire folded side curtain airbag packet to be initially thrust out of the side curtain airbag module while the side curtain airbag is inflated with gas. This has the disadvantage that sufficient vehicle occupant protection is achieved only when the side curtain airbag is fully inflated. In so-called out-of-position cases, that is in cases where a vehicle occupant is not in an ideal position, the problem arises that the side curtain airbag can deploy such that the head of the vehicle occupant is positioned between the side curtain airbag and a side window of the vehicle.

SUMMARY OF THE INVENTION

There is provided in accordance with the present invention a side curtain airbag module comprising a gas supply device comprising a hose that is connected to a source of inflation gas, the module extending in a direction going between the front and rear of the vehicle, the gas supply device extending in a longitudinal direction with respect to the module, and a side curtain airbag that is located laterally with respect to the gas supply device, the side curtain airbag being folded in a zigzag manner forming layers that extend essentially parallel to a direction in which the side curtain airbag is deployed when the side curtain airbag is inflated with gas.

DETAILED DESCRIPTION OF THE INVENTION

Figure 1:
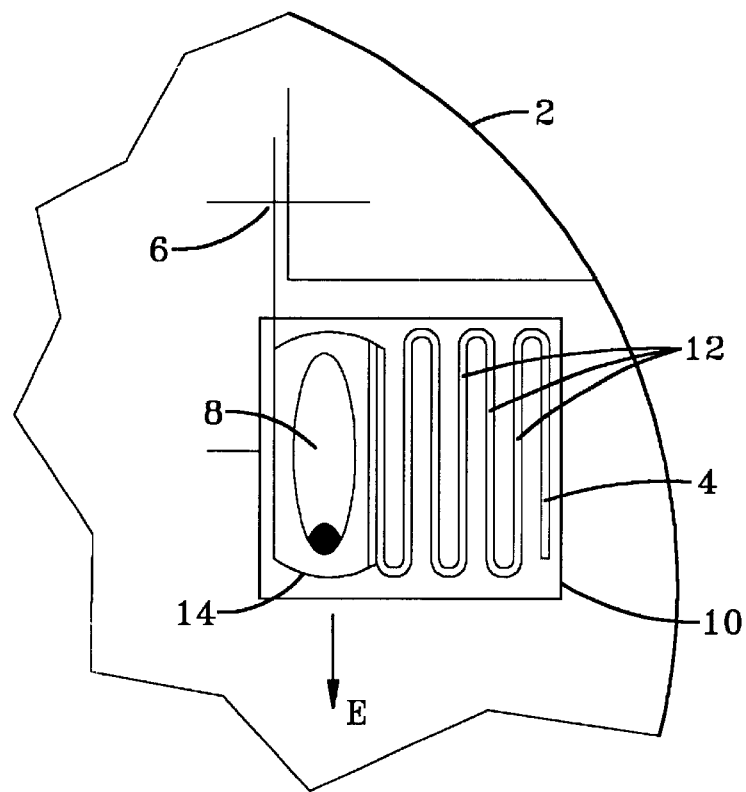
FIG. 1 is a diagrammatic sectional view of a first embodiment of the invention.

FIG. 1 is a diagrammatic sectional view of a side curtain airbag module according to a first embodiment of the invention. The side curtain airbag module is attached to a vehicle's side structure or a roof beam 2 of a vehicle such that it extends in a direction going between the front and rear of the vehicle. The side curtain airbag module preferably extends from an A-pillar of the vehicle to a C-pillar of the vehicle along the roof beam 2. The side curtain airbag module, which comprises a side curtain airbag 4, is attached to the roof beam 2 by suitable fastening means 6, for instance screws. A gas supply device has a hose 8 that extends into the side curtain airbag 4 along essentially the entire length of the side curtain airbag module. There are holes through the hose 8 through which gas can flow from a source of inflation gas, such as a gas generator, into the side curtain airbag 4. The source of inflation gas is located outside or at the end of the side curtain airbag module. The hose enables a high level of flexibility of the side curtain airbag module, whereby the installation in a motor vehicle is facilitated. Alternatively, however, other embodiments of the gas supply device can also be foreseen; for example a tube can be used.

The side curtain airbag 4 and the hose 8 are surrounded by a cover 10, which forms a cover or a housing of the side curtain airbag module, to protect the latter in particular during installation in the vehicle. The side curtain airbag 4 is folded in a zigzag manner; that is to say the side curtain airbag is folded in regular folds, so that the individual layers 12 of the side curtain airbag 4 lie adjacent each other in a parallel manner. Due to this regular arrangement, an extremely regular unfolding during the deployment of the side curtain airbag can be achieved. In the first embodiment shown in FIG. 1 the folded side curtain airbag 4 is completely located to a side of the hose 8, in this case on the of the hose side that faces towards the exterior of the vehicle. It is preferable that the folded side curtain airbag is located on the side of the gas supply device that faces the exterior of the vehicle to ensure that during the deployment process the side curtain airbag deploys essentially along the interior of the vehicle structure, in particular along a side window of the vehicle. This ensures that the side curtain airbag is deployed in out-of-position cases between the head of a vehicle occupant and the vehicle structure. During deployment the side curtain airbag pushes itself between the vehicle structure, especially a side window, and the head of a vehicle occupant, even if the head of the vehicle occupant is close or directly against the vehicle structure or side window.

When the folded side curtain airbag is located only on one side of the gas supply device, that is to say the folded side curtain airbag in a side curtain airbag module is located either on the side of the gas supply device facing the interior of the vehicle, or on the side of the gas supply device facing the exterior of the vehicle, the folded side curtain airbag packet lies laterally with respect to the gas supply device as seen in the horizontal direction. In this case the layers 12 of the folded side curtain airbag 4 extend essentially parallel to the direction E in which the side curtain airbag 4 is deployed when it is inflated with gas. In a conventional side curtain airbag module, which is installed in a motor vehicle, the unfolding direction is essentially the vertical direction. In the present invention the folded side curtain airbag packet is located in essentially the horizontal direction laterally with respect to the gas supply device and the layers of the folding extend essentially vertically. In this arrangement the individual layers of the zigzag folds during the deployment of the side curtain airbag are evenly and successively pulled out of the housing or the cover of the airbag module.

Figure 2:
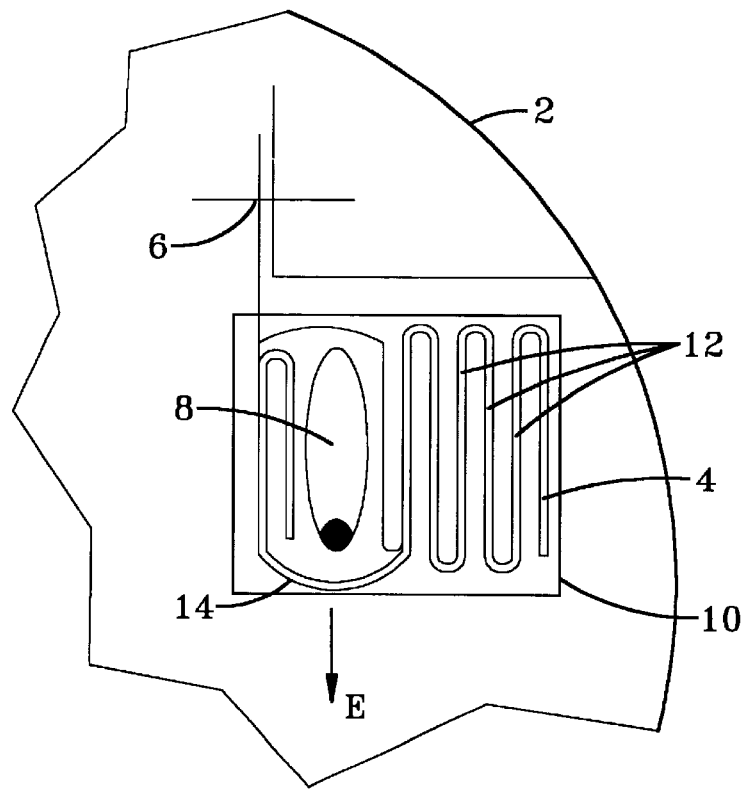
FIG. 2 is a diagrammatic sectional view of a second embodiment of the invention.

Alternatively, the folded side curtain airbag can be located on both sides of the gas supply device. Depending on which side of the gas supply device the folded side curtain airbag is located, the deployment direction and the course of the deployment of the side curtain airbag can be purposefully influenced to achieve the desired protection. FIG. 2 shows a second embodiment of a side curtain airbag module according to the invention that corresponds to the embodiment shown in FIG. 1 with the difference that in the embodiment according to FIG. 2 the folded side curtain airbag is located on both sides of the hose 8. The largest part of the folded side curtain airbag 4, however, is located on the side of the hose 8 that faces towards the exterior of the vehicle, which is the right side in FIG. 2. A smaller part of the folded side curtain airbag is located on the side of the hose that faces towards the interior of the vehicle, that is towards the vehicle occupant, which is the left side in FIG. 2. As in the arrangement shown in FIG. 1, this arrangement ensures that the side curtain airbag unfolds as closely as possible to the vehicle structure and preferably deploys along the interior of the vehicle structure and in particular along a side window of the vehicle, to be able to ensure in out-of-position cases that the inflated side curtain airbag extends between the vehicle structure and the vehicle occupant.

Figure 3:
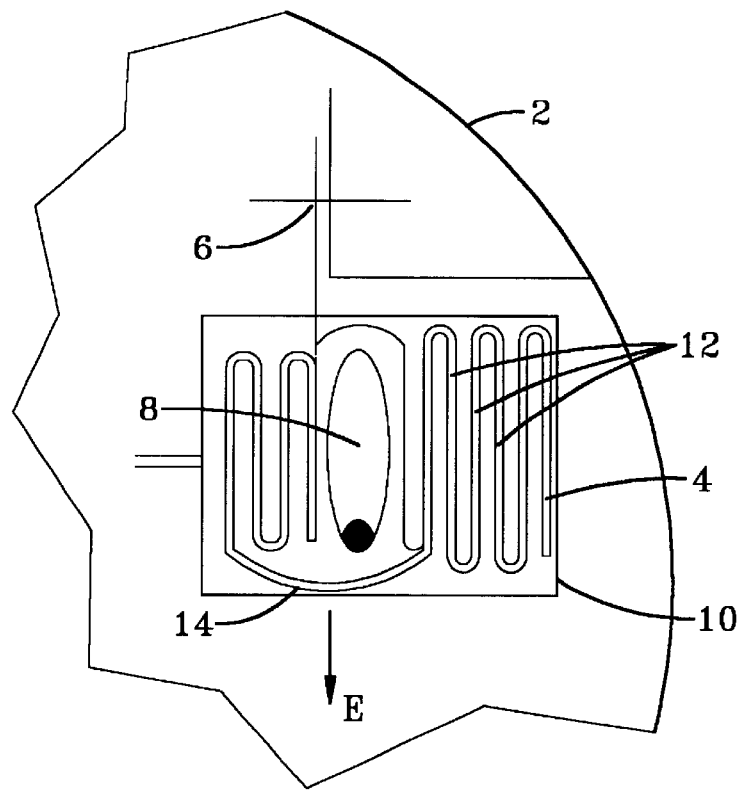
FIG. 3 is a diagrammatic sectional view of a third embodiment of the invention.

FIG. 3 shows a third embodiment of a side curtain airbag module according to the invention. This embodiment also essentially corresponds to the embodiments shown in FIGS. 1 and 2. The larger part of the folded side curtain airbag is preferably located on the side of the gas supply device that faces towards the exterior of the vehicle. This arrangement ensures that during deployment the side curtain airbag unfolds or deploys as closely as possible to the interior of the vehicle structure, in particular a side window of the vehicle, in order also to provide adequate protection in out-of-position cases. The embodiment shown in FIG. 3 differs from the embodiment shown in FIG. 2 only in that in this embodiment a larger part of the folded side curtain airbag 4 is located on the side of the hose 8 which faces towards the interior of the vehicle and therefore the vehicle occupant, which is the left side in FIG. 3. Through varying the portion of the side curtain airbag that is located on the side of the hose 8 facing the interior of the vehicle, the course of the unfolding process can be purposefully controlled during the inflation of the side curtain airbag. The part of the side curtain airbag facing the interior of the vehicle in FIGS. 2 and 3 is the first to be inflated with gas during the deployment of the side curtain airbag 4; subsequently the part of the side curtain airbag which is turned towards the outside of the vehicle is inflated. In this case the side curtain airbag 4 according to the layers 12 of the zigzag folding is gradually pulled out of the cover 10. In this way the side curtain airbag unfolds in a very regular manner during deployment and quickly forms an inflated cushion that is inflated to an extent that ensures an early protection for the vehicle occupant, i.e. as early as the start of the unfolding process.

In all three embodiments according to FIGS. 1 to 3, the folded side curtain airbag is always located beside the hose 8, that is either on the side facing towards the exterior of the vehicle or on the side facing towards the interior of the vehicle. In the direction E of deployment of the side curtain airbag, that is to say below the hose 8, preferably only one layer of the side curtain airbag 4 is located in each case. During the deployment of the side curtain airbag this layer is first moved out of the cover 10 of the side curtain airbag module and the further parts of the side curtain airbag 4 are subsequently pulled out. In this way, at the beginning of the deployment process the entire folded side curtain airbag packet is prevented from being ejected out of the side curtain airbag module. The risk of injury to the vehicle occupant is thus minimized. As a result, viewed in the deployment direction, preferably only one layer of the side curtain airbag comes to lie in front of the gas supply device. The result is that during the deployment of the side curtain airbag, first this one layer is moved out of the side curtain airbag module and subsequently pulls the other parts of the side curtain airbag in a regular manner out of the housing or the cover of the side curtain airbag module. In this way, at the beginning of the deployment of the side curtain airbag, that is to say as soon as the side curtain airbag is deployed into the passenger compartment of the vehicle, an inflated side curtain airbag, which can provide sufficient early protection, is achieved. Since, during the deployment process the side curtain airbag moves forward with the unfolded portion of the side curtain airbag inflated, it can also be ensured that in out-of-position cases the side curtain airbag is deployed between the head of the vehicle occupant and the adjacent side of the vehicle structure. Furthermore, during the deployment of the side curtain airbag the still folded side curtain airbag packet is prevented from being ejected out of the housing or the cover of the side curtain airbag module.

Figure 4:
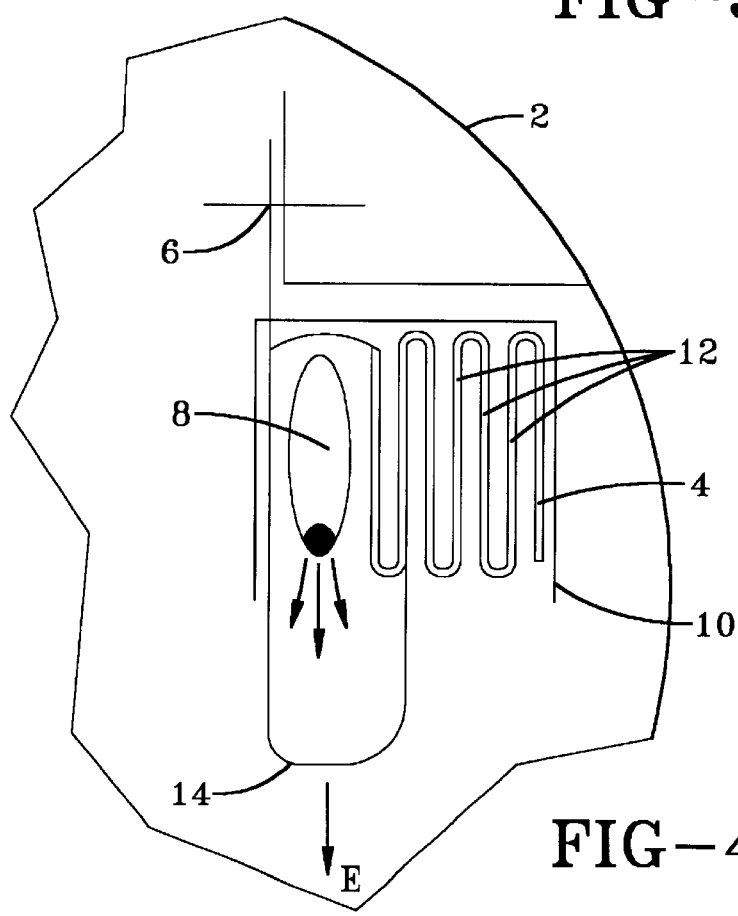
FIG. 4 is a diagrammatic sectional view of the side curtain airbag module according to FIG. 1 during the deployment of the side curtain airbag.

FIG. 4 is a diagrammatic sectional view of the beginning of the deployment process with reference to the embodiment shown in FIG. 1. During the inflation of the side curtain airbag 4, gas is guided through the hose 8 into the inside of the side curtain airbag 4, as indicated by the arrows in FIG. 4. The side curtain airbag 4 is then distended and the front layer 14 of the side curtain airbag 4, which lies in the deployment direction E in front of the hose 8, as shown in FIGS. 1 to 3, is first moved out of the side curtain airbag module and the cover 10. The cover 10 in this case tears open at a desired rupture location, that is not represented in the drawing. The deployment direction of the side curtain airbag is indicated by an arrow E in the drawings. As shown in FIG. 4, due to the fact that the front layer 14 is the first to be moved out of the side curtain airbag module, an inflated side curtain airbag is provided at the beginning of the airbag deployment process, that is to say as soon as the side curtain airbag is deployed into the passenger compartment of the vehicle. Thus even during the deployment process the portion of the side curtain airbag deployed into the passenger compartment of the vehicle is inflated to an extent that can ensure early protection for a vehicle occupant. During the course of the deployment of the side curtain airbag 14, the first layer 14 gradually pulls the layers 12 of the side curtain airbag 4 behind itself and out of the cover 10 of the side curtain airbag module. As shown in FIGS. 1 and 4, since the layers 12 of the folded side curtain airbag 4 are located on the side of the hose 8 that faces towards the exterior of the vehicle, the cushion moves towards the exterior of the vehicle during the further inflation. This ensures that also in out-of-position cases the side curtain airbag is pushed between the vehicle occupant and the interior of the vehicle structure or a side window, to ensure sufficient protection. The side curtain airbag 4 unfolds in a very regular manner during the deployment process, since the layers 12 from the zigzag folding are gradually pulled out of the cover 10.

The deployment of the embodiments shown in FIGS. 2 and 3 takes place in principle in a manner identical to the deployment process shown in FIG. 4. In the embodiments according to FIGS. 2 and 3, however, first the part of the side curtain airbag that faces towards the interior of the vehicle, to the left of the hose 8 in FIGS. 2 and 3, is unfolded. In this case also, the front layer 14 of the side curtain airbag 4 is the first to be moved in the unfolding direction E out of the side curtain airbag module or the cover 10. In all cases the entire folded side curtain airbag packet is prevented from being ejected out of the side curtain airbag module or the cover 10 at the beginning of the deployment process.

From the foregoing, it will be apparent to those skilled in the art that modifications may be made without departing from the spirit and scope of the invention. Accordingly, the invention is not intended to be limited except as may be made necessary by the appended claims.

We claim:

1. A side curtain airbag module comprising a gas supply device comprising a hose that is connected to a source of inflation gas, the gas supply device extending in a longitudinal direction with respect to the module, and a side curtain airbag that is located laterally with respect to the gas supply device, the side curtain airbag being folded in a zigzag manner forming layers that extend essentially parallel to a direction in which the side curtain airbag is deployed when the side curtain airbag is inflated with gas, folded portions of the curtain airbag being located on both sides of the gas supply device.

2. The side curtain airbag module according to claim 1 wherein a larger part of the folded side curtain airbag is located a side of the gas supply device that faces towards the exterior of the vehicle.

3. A side curtain airbag module comprising a gas supply device comprising a hose that is connected to a source of inflation gas, the gas supply device extending in a longitudinal direction with respect to the module, and a side curtain airbag that is located laterally with respect to the gas supply device, the side curtain airbag being folded in a zigzag manner forming layers that extend essentially parallel to a direction in which the side curtain airbag is deployed when the side curtain airbag is inflated with gas, folded portions of the curtain airbag being located on both sides of the gas supply device, during deployment of the side curtain airbag an entire folded side curtain airbag packet is prevented from being ejected out of the side curtain airbag module at the beginning of the deployment process and an inflated side curtain airbag is provided as soon as the side curtain airbag is deployed into a passenger compartment of a vehicle.

4. The side curtain airbag module according to claim 3 wherein a larger part of the folded side curtain airbag is located a side of the gas supply device that faces towards the exterior of the vehicle.

* * * * *